United States Patent
Gartside

(10) Patent No.: US 6,851,058 B1
(45) Date of Patent: Feb. 1, 2005

(54) PRIORITY-BASED VIRUS SCANNING WITH PRIORITIES BASED AT LEAST IN PART ON HEURISTIC PREDICTION OF SCANNING RISK

(75) Inventor: Paul Gartside, Milton Keynes (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 960 days.

(21) Appl. No.: 09/625,534

(22) Filed: Jul. 26, 2000

(51) Int. Cl.[7] .................................................. G06F 1/24
(52) U.S. Cl. ...................................... 713/200; 713/201
(58) Field of Search ................................. 713/200, 201

(56) References Cited

U.S. PATENT DOCUMENTS 6,546,133 B1 * 4/2003 Temkin et al. .............. 382/173

OTHER PUBLICATIONS

Network Associates, "White Papers", http://www.nai.com/asp_set/buy_try/try/whitepapers.asp, 2000, Network Associates, USA.

* cited by examiner

Primary Examiner—Thomas R. Peeso
(74) Attorney, Agent, or Firm—Blakely, Sokoloff, Taylor & Zafman LLP; Christopher J. Hamaty

(57) ABSTRACT

Anti-virus scanners can be deliberately disabled, inadvertently disabled, or simply slowed down to a point where the scanner becomes ineffective and the primary function of the scanning host device is disrupted when a suitably complex file is received by the scanning system for scanning. Archive files pose particular problems for scanners, since archives may contain very complex data structures, and require time consuming analysis. Virus scanners typically scan each element of an archive. Some virus scanners decompress each archive component for scanning. Virus developers have taken advantage of this scanning approach by creating complex archives designed to overwhelm a scanner, leaving a system unprotected or in a denial of service state. To counter such measures, when an archive (or other file) is passed to a scanner, various heuristics are applied to the archive so as to determine a risk-based scanning priority for the archive. Priorities can include normal priority, low priority for archives having suspicious characteristics, and discard without scanning for archives appearing to be constructed so as to overwhelm a scanner. Normal priority scans can occur immediately, while low priority scans can be relegated to only occurring while the scanning system is otherwise idle.

28 Claims, 5 Drawing Sheets

PRIORITY-BASED VIRUS SCANNING WITH PRIORITIES BASED AT LEAST IN PART ON HEURISTIC PREDICTION OF SCANNING RISK

FIELD OF THE INVENTION

The invention generally relates to scanning data for presence of certain characteristics, such as virus code, and more particularly to assigning a scanning priority for scanning the data based on application of heuristics which predict a level of scanning difficulty for the data.

BACKGROUND

With the advent of general access computer networks, such as the Internet, people may now easily exchange application programs and application data between computer systems. Unfortunately, some people have taken advantage of such easy data exchange by developing computer "viruses" designed to spread among and sometimes attack interconnected devices, such as networked computers. A virus is application code that executes on one's computer without one's knowledge, and against one's interests. Viruses tend to replicate themselves within all interconnected devices, allowing an exponential "infection" of other devices.

In response to the security threat intrinsic to viruses, anti-virus programs were developed to identify and remove viruses. Anti-virus programs periodically check a computer system for known viruses, or application code that appears to perform undesired activities, such as reformatting a hard disk. Typically, virus scanners install themselves as part of an operating system, and then scan files, according to user preferences, as the files are created and accessed. Some virus scanners attach themselves to communication input and/or output pathways to inspect data that might not be easily identifiable to an operating system's file based scanning. For example, an E-mail scanner may be attached to a communication port, such as an E-mail transfer port, so as to allow scanning of incoming and outgoing E-mails and their attachments.

E-mail is a common way for a virus to enter into a system otherwise protected by an operating system based scanner, as the E-mail program may receive and store an infected E-mail message without providing opportunity to the operating system scanner to scan the E-mail. For example, an infected E-mail may be received and stored in a database such that there is no individual data, or recognizable data, available for scanning. Thus, an E-mail scanner is used to scan E-mails, and their attachments, as they are received (or sent) by a system.

However, one complication is that an attachment can be any data, and frequently, to reduce data transfer requirements, attachments are compressed and stored as archives. The term archive as used herein includes traditional archive data formats such as ZIP, ZOO, LHA, ARC, JAR, LZW, etc. compressed collections of data files, in addition to other data formats that may embed other files, e.g., Microsoft Word (e.g., ".DOC") documents, Rich Text Format (RTF) files, Object Linking and Embedding (OLE) containers, etc. Scanning archives takes additional time and resources to scan.

Unfortunately, virus developers have recently begun to manufacture "malicious" archives (see FIG. 4) designed to overwhelm viral scanners, such as those used to scan E-mail. The goal is to overwhelm the scanner, and cause it to crash and leave a system undefended against subsequent attacks, or to cause the scanner to "crash" and block further processing of data. That is, in this latter example, if E-mail or file processing is routed through a scanner, and the scanner has crashed, then a "denial of service" for E-mail or file activity occurs until the scanner is restarted.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

DETAILED DESCRIPTION

Without a virus scanner capable of detecting and disposing of malicious archives, receipt of a malicious archive can result in the disablement or stalling of all virus scanning and/or file activity of the scanner's host system. This may then leave users vulnerable to subsequent viral attacks.

Figure 1:
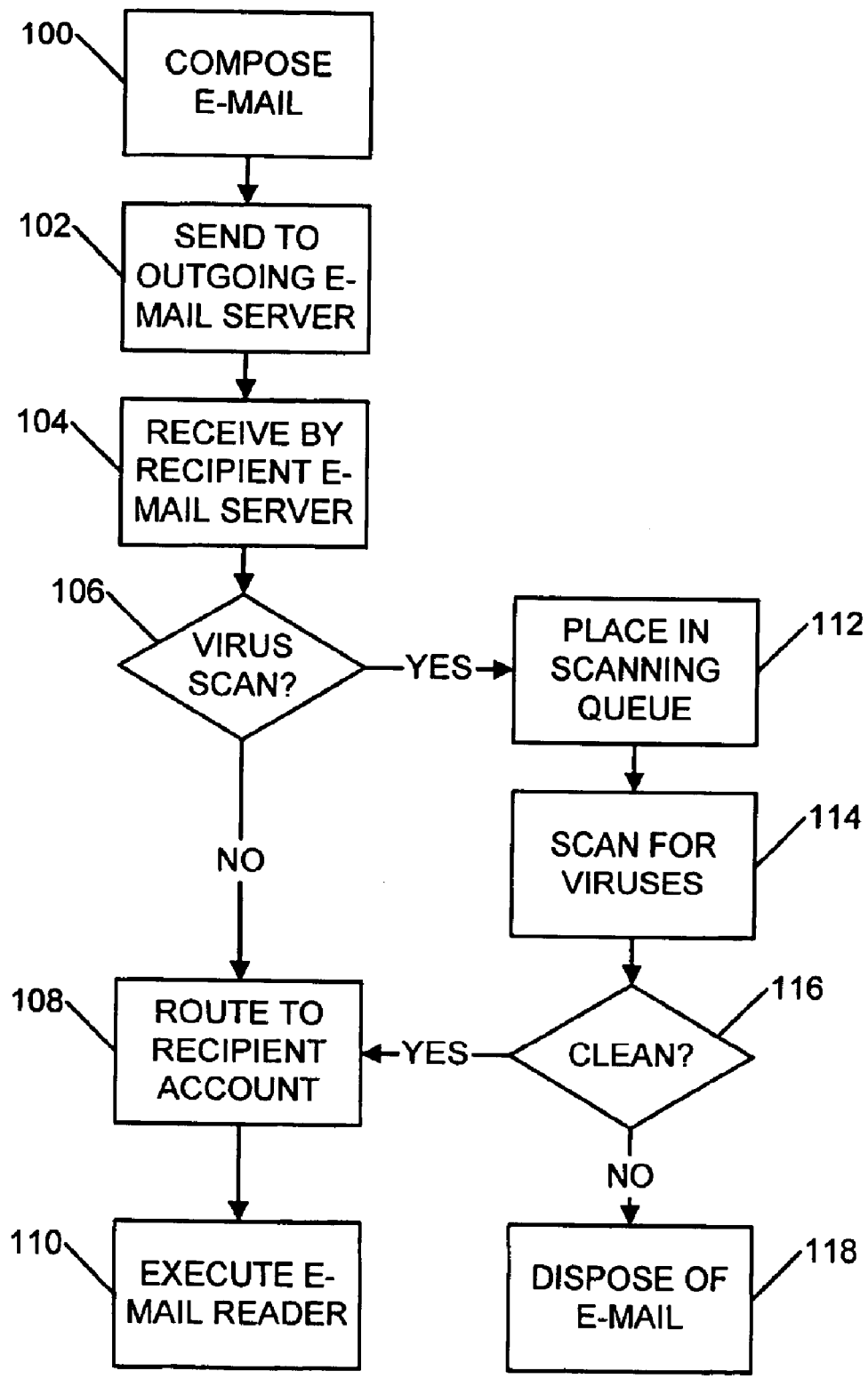
FIG. 1 illustrates a simplified overview for generating, delivering, and scanning E-mail for viruses or other undesired file characteristics.

FIG. 1 illustrates a simplified overview for generating, delivering, and scanning E-mail for viruses or other undesired file characteristics. Further information regarding scanning files, and in particular, archive files, can be found in co-pending U.S. patent application Ser. Nos. 09/517,129 and 09/517,133.

A first operation is composing 100 E-mail which will be scanned before ultimate delivery to another person or entity. It will be appreciated that composition may be by way of an automated technique, such as by an application program which automatically creates a message under a defined circumstance, or manually (e.g., by a person).

Automated generation can be performed, for example, by a tunneling system or router that securely sends data by encrypting it and E-mailing it to a destination which then decrypts the data. Such a configuration allows two end-points to use public (e.g., insecure) E-mailing conduits for transferring data as E-mail between the end points. Manual creation can be performed by a user of an E-mail program, such programs supporting the Post Office Protocol (POP), Internet Message Access Protocol (IMAP), or other mailing protocols.

The composed mail is then sent 102 to an outgoing mail server. The outgoing mail is responsible for presenting the E-mail to a network or other communication pathway for routing to a receiving 104 mail server, which is responsible for continuing delivery to an E-mail's designated recipient. In the above automated encryption example, the outgoing mail server may be responsible for actually performing the encryption of outgoing E-mail data. The recipient may be a person, or instead may be another receiving entity, such as an application program automatically processing incoming E-mail.

In one embodiment, prior to forwarding delivery of E-mail to a designated recipient, a test 106 is performed to determine whether virus scanning should be performed on the E-mail before continuing its delivery to its recipient. If no scanning is being performed, e.g., it is disabled or not installed, then the received E-mail is simply routed 108 to a recipient's account (or delivery is otherwise propagated onwards). The recipient, e.g., a person or automated program, then executes 110 a mail reader to retrieve and process the E-mail in a conventional manner.

If scanning is to be performed, then the scanning engine places 112 the E-mail in a scanning queue for processing. E-mails in the queue are scanned 114 and tested 116 to see if they are free of viruses or other characteristics deemed damaging or otherwise restricted. In one embodiment, scanning an E-mail refers to only scanning attachments associated with an E-mail message. In another embodiment, scanning an E-mail refers to scanning the E-mail message data itself, along with any attachments associated thereto.

If the scanning indicates the E-mail (and/or associated attachments) are clean, then the E-mail is routed 108 to a recipient account as discussed above. If scanning indicates that the E-mail is not clean, then the E-mail is disposed of 118 and appropriate action (not illustrated) taken (e.g., notify an administrator, delete the E-mail (or offending portion thereof), clean/disinfect the E-mail, etc.).

More information regarding virus scanning can be found at Internet location http://www+nai+com/asp_set/buy_try/try/whitepapers+asp. The contents of this web site are incorporated herein by reference as of the date of filing the present application. (Please note: to avoid the preceding uniform resource locator (URL) being interpreted as a valid live-link within patent databases, all periods within the URL have been replaced with plus "+" symbols.)

Figure 2:
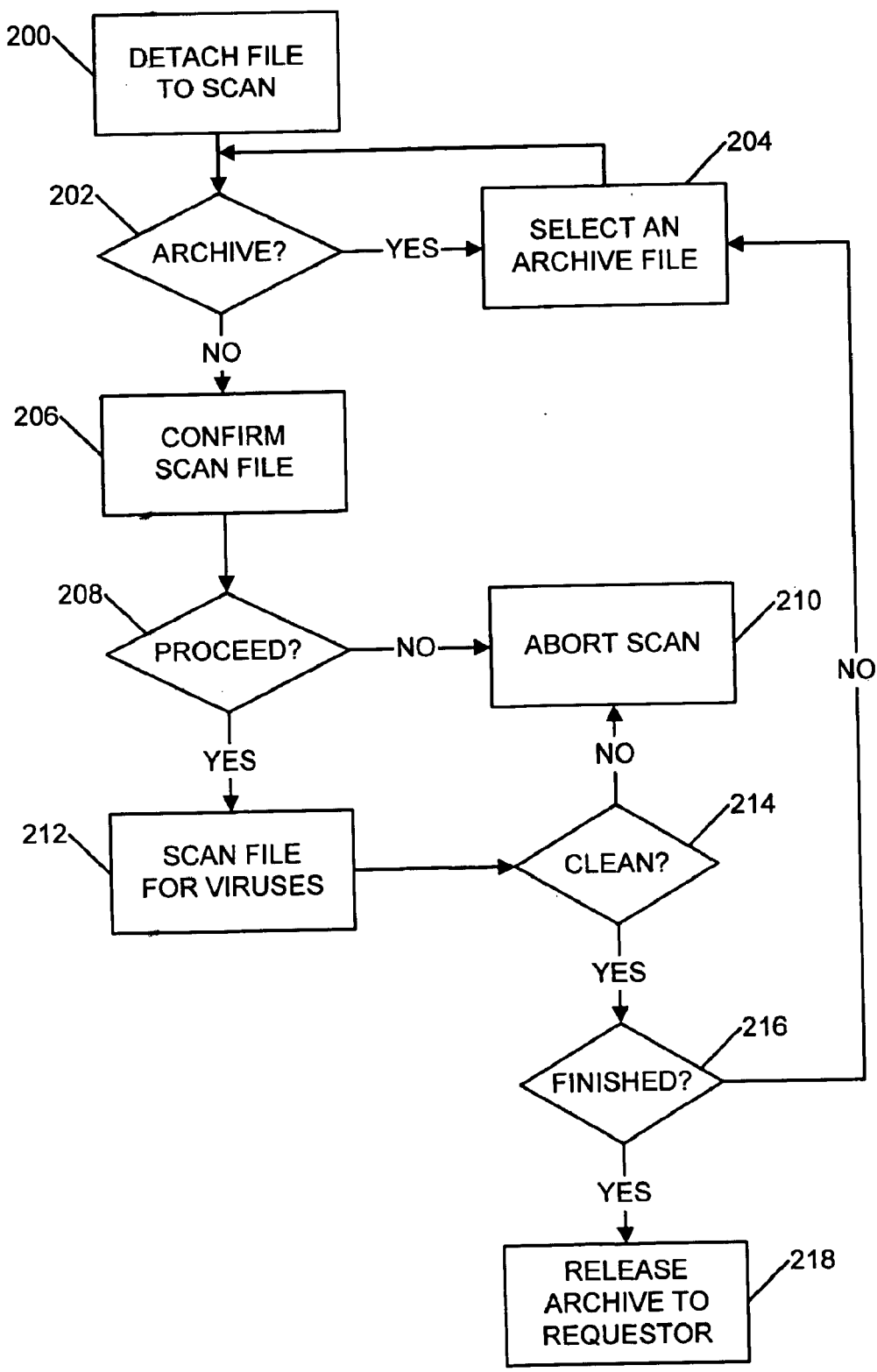
FIG. 2 illustrates one generalized embodiment for scanning archives.

FIG. 2 illustrates one generalized embodiment for scanning archives. It is assumed that the archive is received as an attachment to an E-mail message.

A first operation is to detach 200 the attachment for scanning. For example, as discussed above for FIG. 1, a receiving mailing system 104 can extract E-mail attachments and place 112 them in a queue for processing. A test 202 is made to determine whether the selected file is an archive. If so, a file within the archive is selected 204 for scanning, and it is tested 202 for being an archive. In this fashion, an attachment can be recursively processed to identify and process archive attachments. When a non-archive file has been selected, processing continues with a confirmation 206 as to whether to scan the particular selected file. For example, certain files may be designated as not requiring scanning. A test 208 is made to determine whether to scan, and if not, then scanning aborts 210.

If the test 208 indicates scanning is to proceed, then the file is scanned 212 for viruses. A test 214 is made to determine whether the file is clean, e.g., not having viruses or other undesired characteristics. If the file is not clean, then scanning aborts 210 and subsequent action can be taken, e.g., log the virus, alert a user and/or an administrator, etc. If the file is clean, a test 216 is made to determine whether scanning the archive has completed. If so, then the archive is released 218 to the E-mail recipient. In one embodiment, release means that the E-mail and its attachment is placed in the E-mail recipient's incoming mail queue for retrieval by the recipient.

Unfortunately, the FIG. 2 embodiment is vulnerable to malicious archives specially designed to overwhelm the scanning 212 operation. And, as discussed above, if the scanning engine is configured such that all E-mail, or all host system file access, routes through the scanning engine, then disabling the scanner may leave the system unprotected or in a denial of service state.

Figure 3:
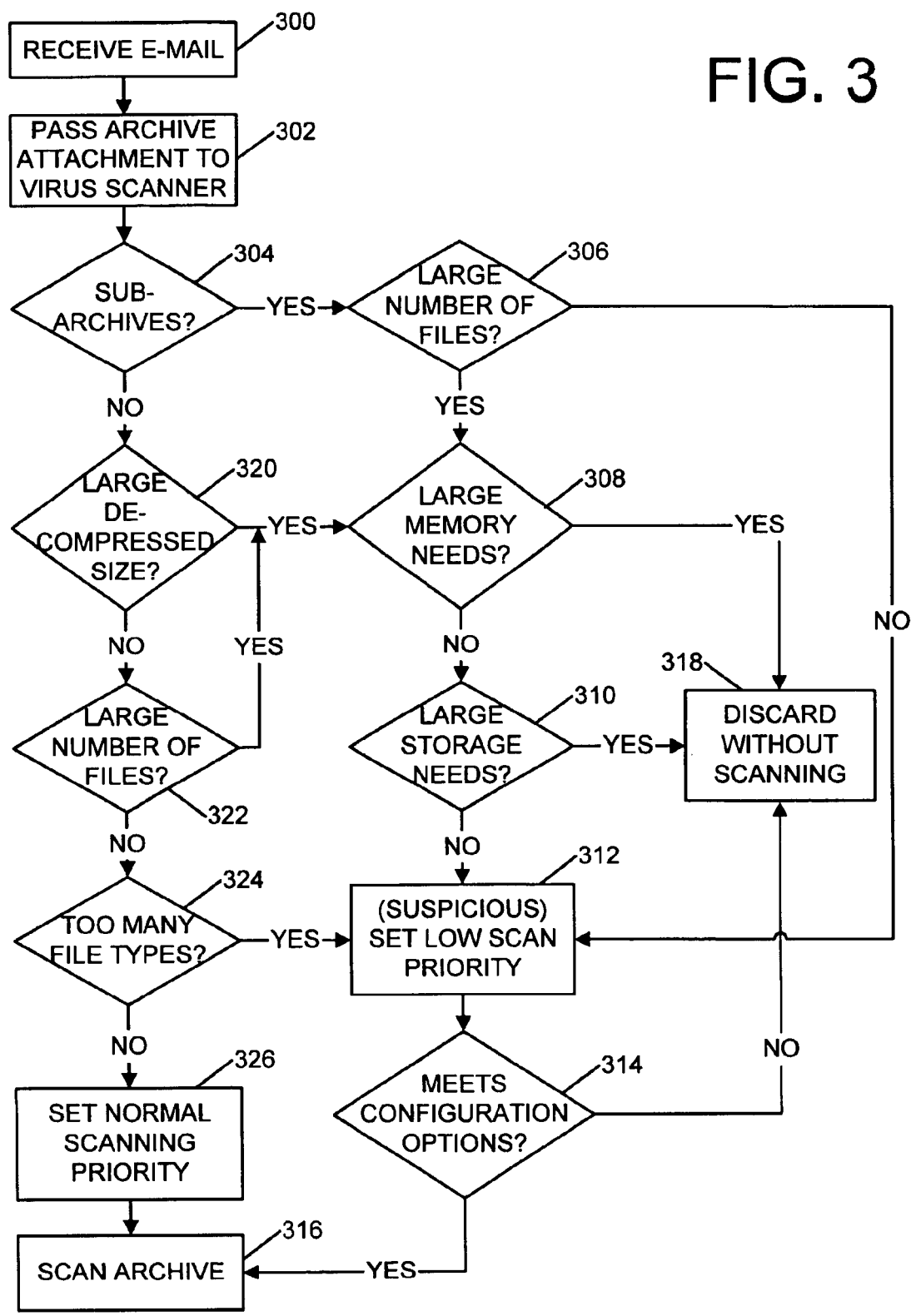
FIG. 3 illustrates a technique for scanning malicious archives.

FIG. 3 illustrates a technique for scanning malicious archives. For the purposes of this description, it is assumed that the archive is received as an attachment to an E-mail message, however, it will be appreciated by those skilled in the art that the archive may be received by other means. For example, the archive can be received by way of a File Transfer Protocol (FTP) application program, or from a web browser download, from file manipulations over a network, or other transmission.

An E-mail is received 300 by the system, and its attachment(s) passed 302 to a scanner. A series of rules, or heuristics, are applied to an attachment to determined whether it is a malicious archive. It will be appreciated that the illustrated ordering of heuristics is per one embodiment, and that the heuristics may be rearranged into another ordering per another embodiment. A suspicion factor is determined so as to allow setting a scanning priority for the attachment. In the illustrated embodiment, there are three scanning priorities: normal, where the archive is directly scanned and then passed on to an E-mail recipient or entity requesting file access to the archive; suspicious, where the archive relegated to a low-priority scanning thread that is provided with fewer resources than normal priority scanning (e.g., fewer processor cycles, restricted memory or storage, etc.); and discard without scanning, where the archive is disposed of without scanning.

Disposal may include placing the attachment in a quarantine zone for later analysis, deleting the file, notifying an administrator or other user regarding receipt of the archive, or taking some other responsive action. It will be appreciated that the above described scanning priorities are exemplary only, and that other scanning priorities and associated responsive actions are contemplated. In particular, it is expected that priorities will vary according to particular scanning environments.

After passing 302 the archive to a scanner, in one embodiment the archive is then tested 304 to determine whether the archive contains sub or nested archives. This is a significant first test since it is very inefficient/slow to recursively scan nested archive files, and this test can be a first point of referral to a low priority scanning thread. Relegating an archive to a low priority scan allows for quick processing of other non-nested archives. If there is a sub-archive, then in one embodiment the archive is then tested 306 to determine whether it contains a large number of files.

For example, the test 306 may be to determine whether the archive contains more than 50 files, since most archives contain fewer than that number of files. The risk addressed by this heuristic is that one may create a small malicious archive, containing many files, such that scanning it may overwhelm the scanner and/or use up all available disk and/or memory space processing the archive entries. And, even if the archive is legitimate, a large number of files within am archive can significantly slow down scanning the archive. Thus, as with nested archives, archives likely to require slow scanning are relegated to a low priority scanning thread.

If the archive has a large number of files, in one embodiment the archive is then tested 308 to determine whether the number of files within the archive exceeds (or come within a certain percentage) of available memory storage space (e.g., available Random Access Memory (RAM)). If not, then the archive is tested 310 to determine whether processing the number of files within the archive will exceed (or come within a certain percentage) of available system storage space (e.g., available allocation units of the system's mass storage). Normal archives do not significantly consume available system resources, and thus archives that do have a significant impact are inherently more suspicious than archives that do not.

Note that the test 310 for storage requirements can differ for different file systems. For example, the Microsoft Disk Operating System (MSDOS) File Allocation Table (FAT) uses a minimum file size depending on a cluster size used on associated storage systems. MSDOS allocates a finite number of clusters within a storage device, and each file requires at least one cluster. Thus, even if cluster sizes are as small as 4 Kilobytes, an archive can be designed to contain many 1 byte files, each of which will require an uncompressed storage requirement of 4 Kilobytes. Hence, it is possible to write very small individual files to a hard disk that prevent the vast majority of the storage from being available for other usage.

Windows NT, in contrast, is less susceptible to such an attack because it uses the Master file Table (MFT) to store files smaller than the minimum cluster size in use for a storage device. However, the MFT has it's own unique limitations, as each time a file is written to an MTF file system, an entry in the MFT is used. If the file is deleted, the MFT space is then made available for reuse. A potential problem with this is that the MFT is capable of dynamic one-way growth. That is, if all available MFT entries are used, then the MFT is grown to provide for additional entries. However, there currently is no provision for compressing the MFT. As the MFT grows in size and becomes fragmented then system performance will suffer. In addition, a malicious archive can contain so many files, so as to cause the MFT to grow very large and consume a significant portion, if not all, of available storage space.

Thus, in one embodiment, storage requirements tests are performed according to the operating system in use. If neither the memory or mass storage requirements are excessive, then the archive is determined 312 to be only suspicious, and relegated to a low scanning priority. In one embodiment, archives (or files) designated as low priority, are further tested 314 against user/administrator configuration options. A low priority scanning thread is still a risk to a scanning system, and there should be constant monitoring of a system to ensure, for example, that a multiply recursive archive file is not slowly consuming resources with multiple low priority archives.

In one embodiment, adjustable user/administrator configuration options can be set according to a degree of acceptable risk the user/administrator wishes to accept regarding scanning suspicious archives (or files). For example, the user/administrator may desire to set a scanning time threshold for low priority archives (or files), and if this time frame is exceeded, then the archive is discarded 318 without scanning. This prevents a low priority thread from becoming a delayed denial of service attack. It will be appreciated that user/administrator options may test for arbitrary characteristics of an archive, so as to cause disposal based on conditions relevant to the scanning environment. However, if the archive meets the user/administrator configuration options, then the archive is scanned 316 per its low priority scan rights.

However, if the archive contains sub-archives, and either the memory or mass storage requirements are excessive, then the archive is determined to be malicious, and the archive is discarded 318 without scanning. In one embodiment, if the archive is from an E-mail attachment, then the E-mail sender and recipient are notified of the disposition of the E-mail attachment.

If the archive does not contain sub-archives, then in one embodiment the archive is tested 320 to determine whether the pre-compression file size of the contents of the archive is greater than a certain size. Even though it is not necessarily a slow/time consuming operation to scan a large archive file, it is a "red flag" in a few Kilobytes of archive data can represent a huge file (e.g., 50 terabytes, or larger) of a repeating character. The intention of such an archive component, as discussed above, is to disable scanners that are configured to decompress an archive file before scanning it. Attempting to decompress such a large file would result in all available mass storage space and/or memory being consumed, potentially rendering the system inoperable.

Thus, if the test 320 of original pre-compression size indicates the archive is excessively large, then in one embodiment the archive memory and storage requirements are tested 308, 310 as discussed above. If the memory or storage requirements are also found to be excessive, then the archive is determined to be malicious, and the archive is discarded 318 without scanning as discussed above.

If the pre-compressed archive size is not found to be excessive, then in one embodiment the archive is tested 322 to determine whether it has a large number of files within the archive. Most legitimate archives have a small number of files within them, e.g., under 50 files. However, it is simple to create a malicious archive file of a relatively small size with so many files within it that it could would either swamp a scanner, or use up all of its available memory or storage space. At the very least an excessive number of files to be decompressed will significantly slow down scanning.

Thus, if the number of files within the archive is excessive of some predetermined number of files (a value that can be set depending on the expected circumstances), then in one embodiment the archive memory and storage requirements are tested 308, 310 as discussed above. If the memory or storage requirements are also found to be excessive, then the archive is determined to be malicious, and the archive is discarded 318 without scanning as discussed above.

If the number of files within the archives is not found to be excessive, then the archive is tested to determine whether there are too many file types within the archive. In one embodiment, it is considered atypical to receive an archive with a number of different types of files therein. (The most likely scenario would be someone sending an entire computer application though the system.) In one embodiment, given that it has already been determined 304, 320, 322 that the archive does not contain sub-archives, does not have an excessive de-compressed size, does not contain a large number of files, the number of file types for being excessive can be set high. However, because it is atypical to receive an archive with a large number of file types, in one embodiment, having more than 50 file types is considered an attack, or a test of the scanning system, and therefore a risk.

If the tests 304, 320, 322, 324 indicate the archive does not contain sub-archives, does not have an excessive de-compressed size, does not contain a large number of files, and does not have too many file types, then the archive is considered to be safe, and it is set 326 to with a normal scanning priority. The archive is then scanned 316 accordingly.

Figure 4:
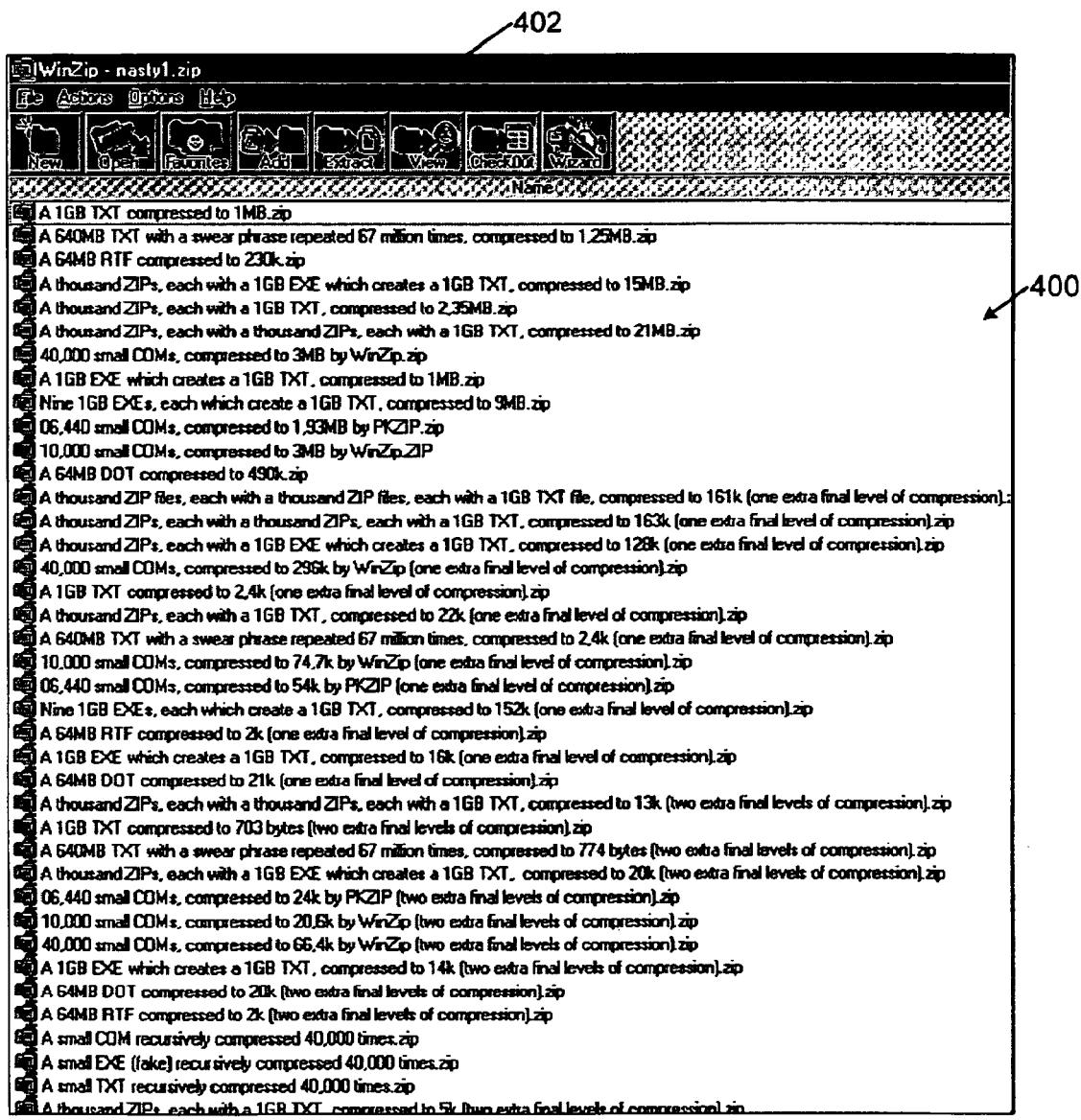
FIG. 4 illustrates a malicious archive.

FIG. 4 illustrates a table of contents 400 for a malicious archive. The malicious archive is being displayed within a graphical user interface 402 of an archive management program. As illustrated, there are many entries within the archive, each corresponding to a file or collection of files designed to crash or block a virus scanner as discussed above.

Figure 5:
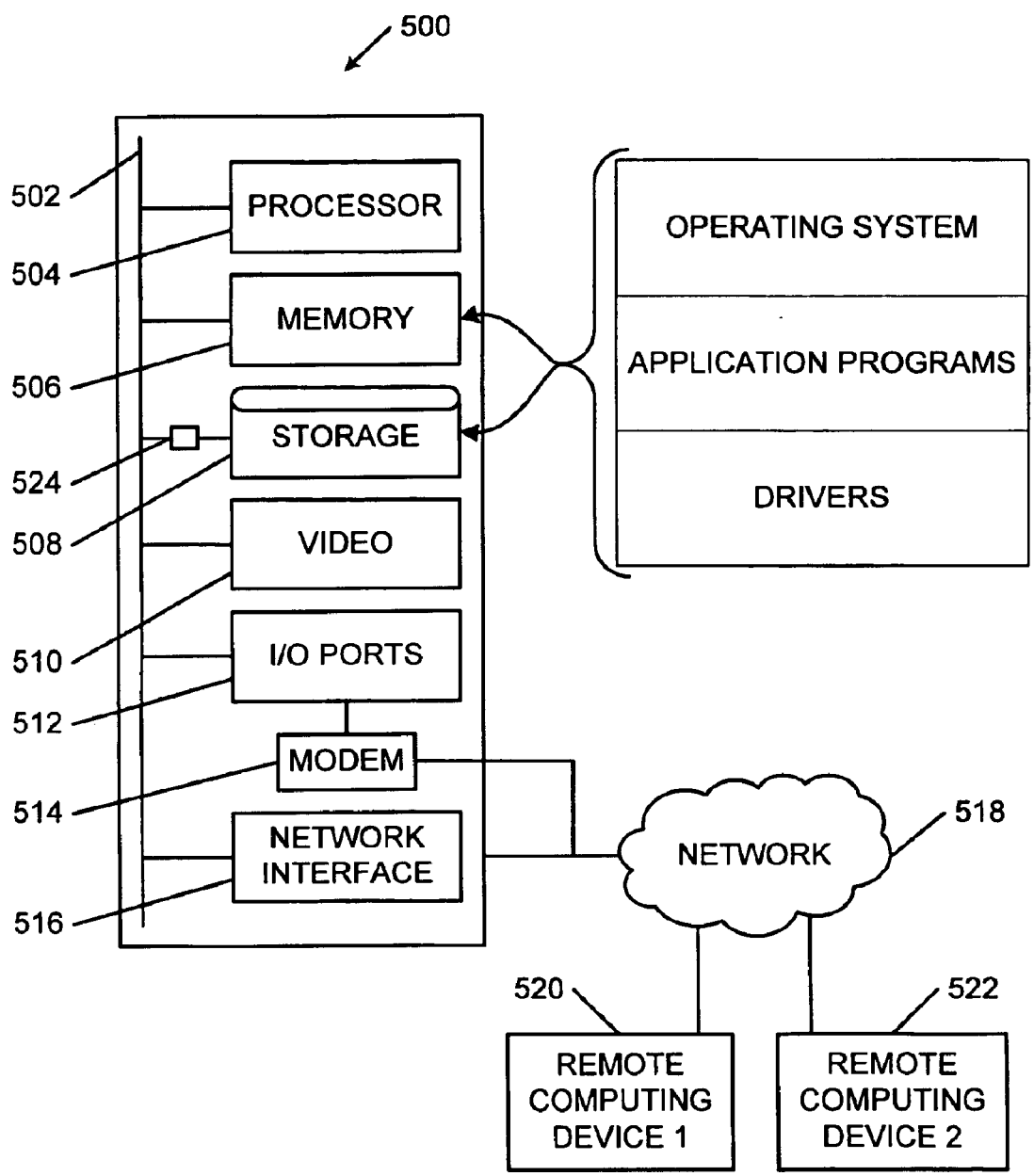
FIG. 5 illustrates a suitable computing environment in which certain aspects the illustrated invention may be practiced.

FIG. 5 and the following discussion are intended to provide a brief, general description of a suitable computing environment in which certain aspects of the illustrated invention may be implemented. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices (e.g., Personal Digital Assistants (PDAs), cellular telephones, etc.). It is understood that modules may be implemented on a single computing device, or processed over a distributed network environment, where modules can be located in both local and remote memory storage devices.

An exemplary system for implementing the invention includes a computing device 500 having system bus 502 for coupling together various components within the computing device. The system 502 bus may be any of several types of bus structures, such as PCI, AGP, VESA, Microchannel, ISA and EISA, etc. Typically, attached to the bus 502 are processors 504 such as Intel, DEC Alpha, PowerPC, programmable gate arrays, etc., a memory 506 (e.g., RAM, ROM), storage devices 508, a video interface 510, input/output interface ports 512.

The storage systems and associated computer-readable media provide storage of data and executable instructions for the computing device 500. Storage options include hard-drives, floppy-disks, optical storage, magnetic cassettes, tapes, flash memory cards, memory sticks, digital video disks, and the like, and may be connected to the bus 502 by way of an interface 524. Computing device 500 is expected to operate in a networked environment using logical connections to one or more remote computing devices 520, 522 through a network interface 516, modem 514, or other communication pathway. Computing devices may be interconnected by way of a network 518 such as a local intranet or the Internet.

Thus, for example, with respect to the illustrated embodiments, assuming computing device 500 is an E-mail server for receiving and scanning incoming and outgoing E-mails and their attachments, then remote devices 520, 522 may respectively be an E-mail originator and intended recipient thereof. It will be appreciated that remote computing devices 520, 522 may be configured like computing device 500, and therefore include many or all of the elements discussed for computing device 500. It should also be appreciated that computing devices 500, 520, 522 may be embodied within a single device, or in separate communicatively-coupled components, and may include routers, bridges, servers, and application programs utilizing network application protocols such as HTTP, File Transfer Protocol (FTP), Gopher, Wide Area Information Server (WAIS), and the like.

Having described and illustrated the principles of the invention with reference to illustrated embodiments, it will be recognized that the illustrated embodiments can be modified in arrangement and detail without departing from such principles. For example, while the foregoing description focused on scanning archives attached to E-mail, it will be recognized that the above techniques and analyses can be applied to scanning data in other contexts having comparable limitations.

And, even though the foregoing discussion has focused on particular embodiments, it is understood that other configurations are contemplated. In particular, even though expressions such as "in one embodiment" and the like may be used herein, such phrases are meant to generally reference embodiment possibilities, and are not intended to limit the invention to particular embodiment configurations. As used herein, these phrases may reference the same or different embodiments, and unless expressly indicated otherwise, are combinable into other embodiments. Consequently, in view of the wide variety of permutations to the above-described embodiments, the detailed description is intended to be illustrative only, and should not be taken as limiting the scope of the invention.

What is claimed as the invention, therefore, is all such modifications as may come within the scope and spirit of the following claims and equivalents thereto.

What is claimed is:

1. A method for scanning data comprising:

receiving an electronic document;

determining the electronic document is an archive file;

applying risk-assessment heuristics to the electronic document to determine a risk factor for scanning the electronic document;

assigning a scanning priority to the electronic document based at least in part on the risk factor, said scanning priorities including low scanning priority, normal scanning priority, and discard without scanning;

selecting a scanning thread, from plural scanning threads having associated thread execution priorities, having an execution priority at least as high as said assigned scanning priority;

assigning performance of scanning the electronic document to said selected scanning thread;

scanning the electronic document according to the scanning priority.

2. The method of claim 1, further comprising:

receiving an E-mail having the electronic document as an attachment;

inspecting, as part of said scanning the electronic document, message text in the E-mail for viruses.

3. The method of claim 1, further comprising:

disposing the method within a multi-processor computing device;

designating a first processor to process at least low scanning priority threads; and assigning said selected scanning thread to the first processor.

4. The method of claim 1, wherein risk-assessment comprises:

determining if the electronic document is an archive containing files; and if so, then selecting for execution at least one of determining if the archive contains a sub-archive, determining if an aggregate de-archived size for said files exceeds a first threshold, determining if a file count of said files exceeds a second threshold, and determining if a file-type count of said files exceeds a third threshold.

5. The method of claim 4, wherein the first threshold is 10 megabytes, the second threshold is 50 files, and the third threshold is 10 file types.

6. The method of claim 1, further comprising:
determining if electronic document is an archive containing files;
if so, then determining if an aggregate de-archived size for said files exceeds a first threshold;
if so, then determining if the aggregate de-archived size exceeds a disk space threshold; and
if so, then setting the scanning priority of the electronic document to low scanning priority.

7. The method of claim 1, further comprising:
determining if electronic document is an archive containing files;
if so, then determining if an aggregate de-archived size for said files exceeds a first threshold;
if so, then determining if a volatile memory requirement for scanning the archive exceeds a memory requirement threshold; and
if so, then setting the scanning priority of the electronic document to low scanning priority.

8. The method of claim 1, further comprising:
first determining if the electronic document is an archive containing files;
second determining if at least one file of the archive is a sub-archive;
third determining if an aggregate de-archived size for the archive exceeds a disk space threshold;
fourth determining if a file count for the archive of said files exceeds a file count threshold; and
if each of said first, second, third and fourth determining evaluate true, then setting the scanning priority of the electronic document to discard without scanning.

9. The method of claim 1, in which the electronic document either is an archive, or contains the archive, the method further comprising:
determining the archive contains at least one sub-archive therein;
determining if the archive contains a large number of files; and
determining if an un-archived size for the archive exceeds a predetermined size limit; and
assigning the scanning priority to be discard without scanning if the archive contains a large number of files, and the un-archived size for the archive exceeds the predetermined size limit.

10. The method of claim 9, wherein if the un-archived size for the archive does not exceed the predetermined size limit, or the archive does not contain the large number of files, the method further comprising:
assigning the scanning priority to be low scanning priority.

11. The method of claim 1, in which the electronic document either is an archive, or contains the archive, the method further comprising:
determining if an un-archived size for the archive exceeds a size limit;
determining if a memory requirement for performing said scanning the electronic document exceeds a memory limit; and
assigning the scanning priority to be discard without scanning if the un-archived size for the archive exceeds the size limit, and the memory requirement for performing said scanning the electronic document exceeds the memory limit.

12. The method of claim 11, wherein if the memory requirement for performing said scanning the electronic document does not exceed the memory limit, the method further comprising:
assigning the scanning priority to be low scanning priority.

13. An article of manufacture comprising a readable medium having programming instructions encoded thereon, which when executed by a processor, are capable of directing the processor to perform the operations of claim 1.

14. The medium of claim 13, said programming instructions including further instructions to direct the processor to perform the operations of claim 3.

15. The medium of claim 13, said programming instructions including further instructions to direct the processor to perform the operations of claim 8.

16. The medium of claim 13, said programming instructions including further instructions to direct the processor to perform the operations of claim 9.

17. The medium of claim 16, said programming instructions including further instructions to direct the processor to perform the operations of claim 10.

18. The medium of claim 13, said programming instructions including further instructions to direct the processor to perform the operations of claim 11.

19. The medium of claim 18, said programming instructions including further instructions to direct the processor to perform the operations of claim 12.

20. The medium of claim 13, said programming instructions including further instructions to direct the processor to perform the operations of claim 4.

21. The medium of claim 20, said programming instructions including further instructions to direct the processor to perform the operations of claim 5.

22. The medium of claim 13, said programming instructions including further instructions to direct the processor to perform the operations of claim 2.

23. The medium of claim 13, said programming instructions including further instructions to direct the processor to perform the operations of claim 6.

24. The medium of claim 13, said programming instructions including further instructions to direct the processor to perform the operations of claim 7.

25. An apparatus comprising:
means for receiving an electronic document;
means for determining the electronic document is an archive file;
means for applying risk-assessment heuristics to the electronic document to determine a risk factor for scanning the electronic document;
means for assigning a scanning priority to the electronic document based at least in part on the risk factor, said scanning priorities including low scanning priority, normal scanning priority, and discard without scanning;
means for selecting a scanning thread, from plural scanning threads having associated thread execution priorities, having an execution priority at least as high as said assigned scanning priority;
means for assigning performance of scanning the electronic document to said selected scanning thread; and
means for scanning the electronic document according to the scanning priority.

26. The apparatus of claim 25 further comprising:
means for designating a first processor to process at least low scanning priority threads within a multi-processor computing device; and
means for assigning said selected scanning thread to the first processor.

27. The apparatus of claim 25, wherein risk-assessment comprises:
means for determining if the electronic document is an archive containing files; and
if so, selecting for operation at least one of means for determining if the archive contains a sub-archive, means for determining if an aggregate de-archived size for said files exceeds a first threshold, means for determining if a file count of said files exceeds a second threshold, and means for determining if a file-type count of said files exceeds a third threshold.

28. The apparatus of claim 25, wherein the electronic document either is an archive, or contains the archive, and further comprising:
means for determining the archive contains at least one sub-archive therein;
means for determining if the archive contains a large number of files;
means for determining if an un-archived size for the archive exceeds a predetermined size limit; and
means for assigning the scanning priority to be discard without scanning if the archive contains a large number of files, and the un-archived size for the archive exceeds the predetermined size limit.

* * * * *

UNITED STATES PATENT AND TRADEMARK OFFICE
CERTIFICATE OF CORRECTION

PATENT NO. : 6,851,058 B1  
APPLICATION NO. : 09/625534  
DATED : February 1, 2005  
INVENTOR(S) : Paul Gartside Page 1 of 1

It is certified that error appears in the above-identified patent and that said Letters Patent is hereby corrected as shown below:

Col. 8, line 39 insert --and-- after "thread;".

Signed and Sealed this

Second Day of February, 2010

David J. Kappos
*Director of the United States Patent and Trademark Office*